United States Patent [19]

Baccei

[11] 4,309,526

[45] Jan. 5, 1982

[54] UNSATURATED CURABLE POLY(ALKYLENE)ETHER POLYOL-BASED RESINS HAVING IMPROVED PROPERTIES

[75] Inventor: Louis J. Baccei, Newington, Conn.

[73] Assignee: Loctite Corporation, Newington, Conn.

[21] Appl. No.: 112,877

[22] Filed: Jan. 17, 1980

Related U.S. Application Data

[63] Continuation of Ser. No. 646,319, Jan. 5, 1976, abandoned, which is a continuation-in-part of Ser. No. 557,740, Mar. 12, 1975, abandoned.

[51] Int. Cl.$^3$ .............................................. C08G 18/28
[52] U.S. Cl. ................................. 528/75; 204/159.11; 204/159.15; 204/159.22; 525/455; 528/59; 528/65; 528/66; 528/76
[58] Field of Search ..................... 528/75, 59, 66, 65, 528/76; 204/159.11, 159.15, 159.22; 525/455

[56] References Cited

U.S. PATENT DOCUMENTS

| | | | |
|---|---|---|---|
| 3,007,831 | 11/1961 | Keenan ................................ 156/52 |
| 3,147,234 | 9/1964 | Polly .................................... 528/230 |
| 3,499,852 | 3/1970 | Schroeder et al. ............ 260/18 TN |
| 3,553,174 | 1/1971 | Hausslein et al. ..................... 528/44 |
| 3,600,359 | 8/1971 | Miranda ................................ 528/44 |
| 3,868,431 | 2/1975 | Hutchinson ........................... 528/44 |

OTHER PUBLICATIONS

The Condensed Chemical Dictionary, Eighth Edition, 1971, p. 307.
Hackh's Chemical Dictionary, Fourth Edition, 1969, p.215.

*Primary Examiner*—Harold D. Anderson
*Attorney, Agent, or Firm*—Jean B. Mauro; Eugene F. Miller

[57] ABSTRACT

A polymerizable composition, suitable for use as an adhesive, sealant or coating, comprising a urethane-acrylate-capped prepolymer based on a polymeric or copolymeric alkylene ether polyol. The composition provides improved properties, particularly cure-through-gap, impact and cryogenic strength properties. A process for preparing the composition and a process for using it are also disclosed.

15 Claims, No Drawings

UNSATURATED CURABLE POLY(ALKYLENE)ETHER POLYOL-BASED RESINS HAVING IMPROVED PROPERTIES

This application is a continuation of Ser. No. 646,319 filed Jan. 5, 1976, now abandoned, which in turn was a continuation in part of Ser. No. 557,740, filed Mar. 12, 1975, now abandoned.

BACKGROUND OF THE INVENTION

1. Field of the Invention

This invention relates to certain poly(alkylene)ether polyol-based resins, curable by peroxy initiation, and having improved impact, and cure-through-volume properties as well as good overall properties. More specifically, it relates to resins which may be viewed as a reaction product of poly(alkylene) ether polyols, preferably diols, with, e.g., methacrylate-capped aromatic diisocyanates.

2. Prior Art

It is known that curable anaerobic resins having desirable properties may be prepared as the reaction product of an organic polyisocyanate and an acrylate ester having an active hydrogen in the non-acrylate portion of the ester. Such resins are disclosed in U.S. Pat. No. 3,425,988 to Gorman et al. This patent relates specifically to monofunctional, acrylate-terminated material which is reacted with organic polyisocyanate in such proportions as to convert all of the isocyanate groups to urethane or ureide groups. The acrylate esters are preferably the acrylates and methacrylates containing hydroxy or amino functional groups on the non-acrylate portions thereof.

It is also known that poly(alkylene)ether glycols may be reacted with organic isocyanates to form urethane prepolymers which are subsequently cured by reaction with an active hydrogen molecule, e.g., with alcohols, amines, water, or other agents. Such systems are two-part systems, that is, the alcohol or amine must be kept separate from the prepolymer until the time of actual use since the mixed system has very limited pot life. As would be expected, the mixing of these viscous liquids leads to problems of nonhomogeniety and therefore imperfect cure, as well as causing substantial inconvenience. Similar urethane coatings curable through the action of moisture are also known, but have the defect that cure begins as soon as the coating is spread, thereby interfering with control of the coating operation and causing inconvenience.

SUMMARY OF THE INVENTION

Now, however, there is provided a polymerizable compositon based on prepolymers which are derived from the reaction between poly(alkylene)ether polyols, preferably glycols, and organic polyisocyanates, preferably diisocyanates, which can be prepared as a one-part system having long pot life and more controllable cure characteristics. The prepolymers of this invention are also characterized by being acrylate, e.g., methacrylate, terminated. These prepolymers are curable by free radical generating initiators, e.g., peroxy compounds or ultraviolet-sensitive compounds. When formulated with hydroperoxides, they acquire anaerobic curing characteristics. The compositions of this invention have broad utility as adhesives, sealants and coatings and generally provide, among other benefits, improved physical properties such as excellent tensile and impact strengths, good flexibility even at low temperatures, and excellent ability to cure through quite large gaps, e.g., 40–50 mils or more.

Specifically, the present invention provides a curable composition comprising:

I. a polymerizable product corresponding in structure to a reaction product of:

(a) a poly(alkylene)ether polyol (preferably glycol) with either of:

(b) (i) at least a molar equivalent of a reaction product of: at least a molar equivalent of an aromatic or cycloaliphatic polyisocyanate with a compound selected from the group consisting of an aromatic or cycloaliphatic polyol or polyamine, or (ii) at least a molar equivalent of an aromatic or cycloaliphatic polyisocyanate, the product of (a) and (b) (i) or (a) and (b) (ii) subsequently being reacted with at least a molar equivalent of a hydroxyalkyl acrylate, a hydroxyalkyl methacrylate, an aminoalkyl acrylate, or an aminoalkyl methacrylate; and II. A free radical initiator.

There is also provided a process for preparing the monomer of Part I, above, comprising reacting the poly(alkylene)ether polyol of Part I(a) with either of:

(i) at least a molar equivalent of a reaction product of: at least a molar equivalent of an aromatic or cycloaliphatic polyisocyanate with a compound selected from the group consisting of an aromatic or cycloaliphatic polyol or polyamine, or (ii) at least a molar equivalent of an aromatic or cycloaliphatic polyisocyanate, the product subsequently being reacted with at least a molar equivalent of a hydroxyalkyl acrylate, a hydroxyalkyl methacrylate, an aminoalkyl acrylate, or an aminoalkyl methacrylate.

In addition, there is provided a process for sealing or adhering surfaces which comprises applying to at least one of said surfaces the above polymerizable compositions, then placing said surfaces in an abutting relationship until the composition has cured.

DETAILED DESCRIPTION OF THE INVENTION

The monomer of the present invention may be viewed as a one-component polymerizable block copolymer (prepolymer) having well-defined rigid and flexible segments. This is achieved by the chemical linking of two precursor "prepolymers" which are subsequently "capped" with acrylate, e.g., methacrylate, functionality. Accordingly, in a preferred embodiment, a "flexible" polymeric methylene ether diol segment of relatively low molecular weight is reacted with a molar excess of a "rigid" diisocyanate such as toluene diisocyanate or methylene diisocyanate (4,4'-diisocyanato diphenylmethane), thereby forming urethane linkages. Before reacting with the poly(alkylene)ether diol, the diisocyanate is preferably reacted in excess with another rigid moiety containing at least two active hydrogen atoms, such as in hydroxy or amine groups, thereby capping the other rigid moiety with —NCO groups. By the term "rigid" segment is meant a segment or segments containing aromatic, heterocyclic or cycloaliphatic rings. If multiple segments are involved, they should be joined by either fusing of the rings or by a minimum of carbon atoms (e.g. 1–2 if linear, 1-about 8 if branched) or hetero atoms such that there is little or no flexing of the segments. By the term "flexible" segment is meant a segment comprising primarily linear aliphatic ether moieties. Pendent functional groups, including aromatic, heterocyclic and cycloaliphatic, among others, as well as branching, may also be incorporated, provided that there is no substantial interference with the necessary flexible nature of the linear portion nor degradation of the cured resin properties disclosed herein.

Illustrative of the polyisocyanates employed in the preparation of the new monomers are, among others, phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenyl-methane. Still other polyisocyanates that may be used are the higher molecular weight rigid polyisocyanates obtained by reacting polyamines containing terminal, primary and secondary amine groups or polyhydric alcohols, for example, the alkane, cycloalkane, alkene and cycloalkene polyols such as glycerol, ethylene glycol, bisphenol-A, 4,4'-dihydroxyphenyldimethylmethane-substituted bisphenol-A, and the like, with an excess of any of the above-described isocyanates. These higher molecular weight urethane or ureide polyisocyanates may be represented by the formula:

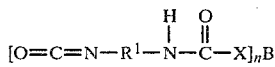

wherein $R^1$ is an organic radical selected from the group consisting of alkyl, alkenyl, cycloalkyl, cycloalkenyl, aryl, aralkyl and alkaryl radicals of 2 to about 20 carbon atoms, both substituted and unsubstituted; X is —O— or

wherein $R^2$ is hydrogen or lower alkyl of 1 to 7 carbon atoms; B is a polyvalent organic radical selected from the group consisting of cycloalkyl, cycloalkenyl, aryl, aralkyl, alkaryl and heterocyclic radicals, both substituted and unsubstituted; and n is an integer from 2 to about 6.

As indicated above, the diisocyanate is preferably reacted with another rigid segment comprising an aromatic, heterocyclic or cycloaliphatic compound containing at least two active hydrogen atoms, preferably diamines and more preferably diols. Suitable compounds are 2,2-(4,4'-dihydroxydiphenyl)-propane (i.e., bisphenol-A), 4,4'-iso-propylidenedicyclohexanol (i.e., hydrogenated bisphenol-A), ethoxylated bisphenol-A, propoxylated bisphenol-A, 2,2-(4,4'-dihydroxydiphenyl)-butane, 3,3-(4,4'-dihydroxydiphenyl)-pentane, α,α'-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols such as 4,8-bis-(hydroxymethyl)-tricyclo [5.2.1.0$^{2,6}$]-decane, 2,2,4,4-tetramethyl-1,3-cyclobutanediol, hydroquinone, resorcinol, 2,2-(4,4'-dihydroxydiphenyl)-sulfone, and 4,4'-oxydiphenol, among others, as well as halogenated derivatives of the above, such as tetrabrominated ethoxylated bisphenol-A. These ring compounds may also be substituted with either reactive groups or unreactive groups such as alkyl groups containing about 1 to 4 carbon atoms. This reaction may be carried out at temperatures from room temperature to about 180° C., preferably about 40°–120° C., depending upon the specific reactants selected. At the lower temperatures, use of standard catalysts may be desirable. Unreactive diluents may be used, if desired.

The polyisocyanate thus formed is reacted with a polymeric alkylene ether compound having at each end of the chain a functional group containing a reactive hydrogen atom, preferably in a hydroxyl group.

The poly(alkylene)ether or copoly(alkylene)ether compounds of this invention conform to the formula:

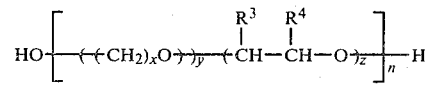

wherein x is an integer from 1 to about 8, y is an integer from 0 to about 20, z is an integer from 0 to about 10, and n is an integer of about 1 to about 100. Preferably, x is 2 to about 6, y is 1 to about 5, z is 0 to 2, and n is 3 to about 60. More preferably, x is 4 to about 6, y is 1 to 2, z is 0 to 1, and n is 5 to about 40. $R^3$ and $R^4$ may be hydrogen, lower alkyl radicals containing 1 to about 3 carbon atoms, cycloaliphatic, cycloalkenyl or aromatic radicals comprising up to about 8 carbon atoms and heterocyclic radicals comprising up to about 8 carbon/hetero atoms. It is also highly desirable that the glycol be linear in order to provide a high degree of flexibility in the segment. Suitable linear polyols would include poly(tetramethylene)ether glycol and poly(ethylene)ether glycol, among others. Representative branched polyols include poly(1,2-propylene)ether polyol and poly(1,2- or 1,3-butylene)ether glycol. Preparation and properties of polyols of these types are discussed in the literature, e.g., Saunders, J. H., and Frisch, K. C., "Polyurethanes—Chemistry and Technology," Interscience, New York, New York, (1963).

In a preferred embodiment, the flexible poly(alkylene) ether having functional groups containing an active hydrogen is reacted with the polyisocyanate in such proportion that the polyisocyanate is present in molar excess as to the concentration of the active hydrogen-containing groups. In this way a product is assured which has an —NCO group at each end of the poly(alkylene)ether segment. The molar excess of polyisocyanate may vary from about 0.05 to about 6.

This reaction may be carried out at temperatures from about room temperature to about 150° C., preferably from about 40° C. to about 120° C. After addition of the flexible diol, about 0.1 to 30 hours are required for completion at the preferred temperature range. The reaction may also be catalyzed, if desired, and unreactive diluents may be used for viscosity control.

The product of the above reaction is reacted with a molar equivalence, preferably a molar excess, based on —NCO group content, of an acrylate or methacrylate ester containing a hydroxy or amine group on the nonacrylate portion thereof. This results in an adhesive/sealant monomer, or more accurately, prepolymer, capped at both ends with acrylate or methacrylate functionality. Esters suitable for use in this invention correspond to the formula

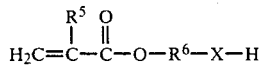

wherein X is as previously defined, $R^5$ is selected from the class consisting of hydrogen, chlorine and methyl and ethyl radicals; and $R^6$ is a divalent organic radical selected from the group consisting of lower alkylene of 1-8 carbon atoms, phenylene and naphthylene.

The suitable hydroxy- or amine-containing materials are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the monoacrylate or monomethacrylate esters of bisphenol-A and bisphenol-B and their fully hydrogenated derivatives, cyclohexyl diol, and the like.

The reaction may be accomplished in the presence or absence of diluents. Preferably, diluents which include the hydrocarbons, such as aliphatic, cycloaliphatic and aromatic hydrocarbons, for example, benzene, toluene, cyclohexane, hexane, heptane, and the like, are employed, but other diluents, such as methyl isobutyl ketone, diamyl ketone, methyl methacrylate, isobutyl methacrylate, lauryl methacrylate, isobornyl methacrylate, and cyclohexyl methacrylate can also be beneficially utilized, if desired, especially where complete compatibility with the sealant system is desired. Mixtures of diluents may also be used.

The temperature employed in the reaction may also vary over a wide range. Where the components are combined in approximately chemical equivalent amounts, useful temperatures may vary from room temperature or below, e.g., 10° C. to 15° C., up to and including temperatures of 100° C. to 180° C. Where reacting the simpler isocyanate adducts, the components are preferably combined at or near room temperature, such as tempeatures ranging from 20° C. to 30° C. At the lower reaction temperatures, use of a catalyst is preferred. When reacting the higher molecular weight isocyanate adducts, higher temperatures are preferred, e.g., about 40° C. to about 150° C.

It will be recognized that the acrylate-terminated adducts of this invention can be prepared by processes other than that described above. Thus, for instance, the polyisocyanate compound can be reacted with a suitable hydroxyacrylate and this adduct reacted with a suitable methylene ether polymer having the necessary reactive hydrogen.

The fully-prepared monomeric prepolymers of this invention correspond to the formula

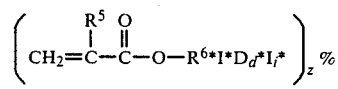

wherein $R^5$ and $R^6$ are as previously defined; I is a polyisocyanate radical; D is an aromatic, heterocyclic or cycloaliphatic polyol or polyamine radical, preferably a diol, and more preferably a diol of a cycloaliphatic compound; Z is a polymeric or copolymeric methylene ether polyol radical as already described; z is an integer corresponding to the valency of z; d is either 1 or 0; and i is 0 when d is 0, and otherwise is equal to one less than the number of reactive hydrogen atom of D. As used herein, an asterisk (*) indicates a urethane (—NH—COO—) or ureide (—NH—CO—NH—) bond.

The prepolymer described above cures to a hard, tough resin via a free-radical mechanism using any of a wide variety of known peroxy initiators. Illustrative of such initiators are the diacyl peroxides such as benzoyl peroxide; dialkyl peroxides such as di-tert.-butyl peroxide; ketone peroxides such as methylethyl ketone peroxide; and peresters which readily hydrolyze, e.g., tert.-butyl peracetate, tert.-butyl perbenzoate, di-tert.-butyl diperphthalate, etc. A particularly useful class of peroxy initiators are the organic hydroperoxides such as cumene hydroperoxide, methylethyl ketone hydroperoxide, tert.-butyl hydroperoxide, etc. Of these, cumene hydroperoxide is especially preferred. The initiators should be used at a concentration of about 0.01 percent to about 10 percent by weight of the total formulation, preferably about 0.1 percent to about 5 percent by weight. Another useful class of initiators comprises carbonyl-containing ultraviolet-activated free-radical generators, such as acetophenone, benzophenone, and the benzoin ethers. Suitable UV initiators are disclosed in co-pending application Ser. No. 356,679 now abandoned, filed May 2, 1973. Initiator mixtures may also be used.

It will also be understood that the curable composition of this invention can also be formulated as a two-part composition. In such a case, the initiator or one of a combination of initiators can comprise a second part which is combined with the first, monomeric, part at the point of use. Thus, the monomer can be applied to one surface to be joined, the initiator can be applied to a second surface, and the two surfaces then joined. Similarly, an accelerator, such as mentioned below, can be applied separately as a second part to one of the surfaces to be joined, e.g., as a "primer."

It may be desirable to accelerate the cure polymerization by application of moderate amounts of heat, e.g., 50° C. to 150° C. At temperatures above about 125° C., cure will typically be complete within about 10 minutes or less.

The prepolymers of this invention can be formulated into room temperature-curing anaerobic adhesives and sealants. Formulations of this type as well described in the art, e.g., U.S. Pat. No. 3,042,820 to Krieble, among others, utilizing the hydroperoxide class of initiators. Such anaerobic formulations may also advantageously include polymerization accelerators such as organic imides (e.g., benzoic sulfimide) and primary, secondary or tertiary amines, and inhibitors or stabilizers of the quinone or hydroquinone families. The accelerators are generally employed in concentrations of less than 10 percent by weight, and the inhibitors in concentrations of about 10 to 1,000 parts per million. When prepared as anaerobic formulations, the compositions of this invention have the advantage of long-term stability and the ability to cure at room temperature upon exclusion of oxygen, as between the mating threads of a nut and bolt or the juxtaposed surfaces of a bearing and shaft. The anaerobic cure speed can be enhanced by application of moderate heat, e.g., up to about 150° C.

The adhesive and sealant formulations of this invention may be prepared, if desired, with reactive diluents, and mixtures thereof, which are capable of copolymerizing with the instant prepolymers. Typical of such diluents are the hydroxyalkyl acrylates and diacrylates such as hydroxyethyl acrylate, hydroxypropyl acrylate, and the corresponding methacrylate compounds, including cyclohexyl methacrylate, methyl methacrylate, isobornyl methacrylate, lauryl methacrylate, triethylene glycol dimethacrylate, isobutyl methacrylate and tetrahydrofurfuryl methacrylate. Other unsaturated reactive diluents, such as styrene and acrylonitrile, can also be used. When used, the concentration of such diluents should be less than about 60 percent by weight, and preferably about 40 to about 10 percent.

One of the significant advantages of the prepolymers of this invention is their exceptional ability to cure through large gaps, e.g., up to about 85 mils. This behavior may be enhanced by application of moderate heat. Preferably, however, it is enhanced by use of any of the primers known for anaerobic systems, such as those disclosed in U.S. Pat. No. 3,625,930 to Toback, et al., and particularly those of the thiourea type disclosed in copending application Ser. No. 498,904, filed Aug. 20, 1974 now U.S. Pat. No. 3,970,505, issued July 20, 1976. Such primers are advantageously applied as a spray from dilute solvent solution to either or both surfaces to be joined.

The following examples provide specific illustrations of various aspects of the present invention and are in no way limitations on it.

EXAMPLE 1

A nitrogen-swept 4-necked resin kettle equipped with a stainless steel stirrer, nitrogen inlet tube, thermometer, condenser and entrance port, was heated to approximately 65° C. and charged with the following: 76.5 grams of methylene-bis-phenylisocyanate (MDI) and a solution of 43.0 grams of triethyleneglycol dimethacrylate (TRIEGMA) and 200 ppm of a quinone stabilizer. The mixture was heated to about 60°–65° C. and 95.5 gram of a 625 molecular weight polytetramethylene ether glycol (PTME) (Polymeg 650,OH# = 179.9, The Quaker Oats Company, Chicago, Ill.) was added over a 2–3 hour period. The temperature was maintained in the 60°–70° C. range.

A diluent solution of 20.0 grams TRIEGMA and 200 ppm quinone stabilizer was gradually added to maintain a fluid reaction medium. Approximately 1½ hours after completion of the glycol addition a sample was removed for NCO analysis. The percentage of NCO for the theoretical MDI-capped Polymeg product (abbreviated MDI*[Polymeg 650]*MDI), dissolved in the amount diluent used, is 5.39% ("A" stage). (As used in these examples, asterisks represent urethane bonds). A dibutylamine titration procedure yielded a titer of 5.23%. After removal of the sample for NCO analysis, 61.5 grams of 96% hydroxypropyl methacrylate (HPMA) was added over a 10 minute period to the reaction mixture. Heating was continued for another 2 hours with the temperature maintained at 60°–70° C. The resultant solution contained approximately 72% concentration of urethane dimethacrylate structures corresponding to the general formula (HPMA*MDI)$_2$*[PTME-650].

EXAMPLE 2

To a nitrogen swept, heated (about 75° C.) resin kettle, equipped as described in Example 1, was charged 50.0 grams of MDI followed by a solution of 35.0 grams of TRIEGMA and 200 ppm of a quinone stabilizer. The mixture was heated to 70°–75° C. and 96.2 grams of a 960 molecular weight polytetramethylene ether glycol (Polymeg 1000,OH# = 116.6, The Quaker Oats Co.), heated to approximately 60° C., was added over a 3–3½ hour period. The reaction temperature was maintained at 65°–75° C. and heating was continued for approximately one hour after completion of the glycol addition. A diluent solution of 15.8 grams TRIEGMA and 200 ppm of a quinone stabilizer was gradually added to maintain a fluid reaction medium. Approximately ½ hour after completion of the glycol addition, a sample was removed for NCO analysis and found to be the desired MDI*[PTME-1000]* MDI prepolymer. The theoretical percentage of NCO for the prepolymer (including solvent) was 4.19%; the titration yielded a titer of 4.21%. Hydroxypropyl mthacrylate (96%, 42.6 grams) was added over a 10-minute period and heating was continued for another 1½ hours at 65°–75° C. The resultant solution contained approximately 72% concentration of urethane dimethacrylate structures corresponding to the general formula (HPMA*MDI)$_2$*[PTME-1000].

EXAMPLE 3

To a nitrogen swept, heated (60° C.) resin kettle, equipped as described in Example 1, was charged 39.2 grams of MDI followed by a solution of 44.5 grams of TRIEGMA and 200 ppm of a quinone stabilizer. At approximately 60° C., 154.1 grams of a 1960 molecular weight polytetramethylene ether glycol (Polymeg 2000,OH# = 57.1, The Quaker Oats Co.) was added to the heated MDI solution (60° C.) over a three hour period. The temperature of the reaction mixture was maintained at 65°–75° C. After completion of the glycol addition, heating was continued for an additional hour. A solution of 20.3 grams of TRIEGMA and 200 ppm of a quinone stabilizer was gradually added to maintain a fluid reaction medium. Finally, 39.1 grams of a 96% hydroxypropyl methacrylate was added and further heating at 60°–65° C. was maintained for another 2 hours. The resultant solution contained approximately 72% concentration of urethane dimethacrylate structures corresponding to the general formula (HPMA*MDI)$_2$*[PTME-2000].

EXAMPLE 4

To a nitrogen swept resin kettle, equipped as described in Example 1, was charged 69.6 grams of toluene diisocyanate (TDI) (80%, 2,4-/20% 2,6-). The TDI was heated to approximately 95°–100° C. Thirty-six grams of hydrogenated bisphenol-A (HBPA) was added slowly in 2 hours. Fifteen hours after the HBPA addition was completed, a solution of 60 grams TRIEGMA and 300 ppm of a quinone stabilizer was added slowly over a 10 minute period. Fifteen minutes later, addition of 12.0 grams HBPA in 4–6 portions was performed. Fifteen minutes after all the HBPA was in (total, 48.0 grams), the bath temperature was lowered such that the reaction temperature was at 60°–65° C. The reaction mixture consisted of toluene diisocyanate capped-HBPA prepolymer(s) (abbreviated TDI*HBPA*TDI) dissolved in TRIEGMA.

To the reaction solution was added 62.1 grams of a Polymeg 650 glycol over a 1½ hour period. The reaction solution was maintained at 60°–65° C. and heating and stirring were continued for approximately one hour after completion of the glycol addition. The reaction mixture consisted of TDI*HBPA*TDI capped Polymeg 650 prepolymer(s) (abbreviated (TDI*HBPA*TDI)$_2$*(PTME-650]) dissolved in TRIEGMA. A solution of 43.3 grams of 96% hydroxypropyl methacrylate, 1.8 grams TRIEGMA, and 100 ppm of a quinone stabilizer was added and the reaction solution was maintained at 65°-70° C. for approximately 1½ hours. The resultant solution contained approximately 72% concentration of urethane dimethacrylate structures corresponding to the general formula (HPMA*TDI*H-BPA*TDI)$_2$* [PTME-650].

EXAMPLE 5

To a nitrogen swept resin kettle, equipped as described in Example 1, was charged 69.6 grams of TDI. The TDI was heated to approximately 95° C. Thirty-six grams of HBPA was added slowly in 1½ hours. Fifteen minutes after the HBPA additions were completed, a preheated (about 50° C.) solution of 45.0 grams of TRIEGMA and 150 ppm of a quinone stabilizer was added over a 10-minute period. When the reaction temperature reached 95° C., addition of 12.0 grams of HBPA in 4-6 portions was performed. Fifteen minutes after the completion of HBPA additions, the bath temperature was lowered such that the reaction temperature dropped to 60°-65° C. To the reaction solution was added 96.2 grams of a polytetramethylene ether glycol (Polymeg 1000) in approximately 2 hours. Heating and stirring were continued at 64°-69° C. A sample for NCO analysis was removed one-half hour after completion of the glycol addition. A titer of 3.35% NCO (vs 3.22% theoretical) was obtained for the reaction solution. Apparently, the desired TDI*HBPA*TDI-capped ether prepolymer(s) was formed (abbreviated TDI*HBPA*TDI)$_2$*[PTME-1000]). A diluent solution of 36.4 grams of TRIEGMA and 150 ppm of a quinone stabilizer was added to maintain a fluid reaction medium. Finally, 48.0 grams of 96% hydroxypropyl methacrylate was added to cap the prepolymer ends with methacrylate functionality. The resultant solution contained approximately 70% concentration of urethane dimethacrylate structures corresponding to the general formula (HPMA*TDI*HBPA* TDI)$_2$*[PTME-1000].

EXAMPLE 6

To a nitrogen swept resin kettle, equipped as described in Example 1, was charged 34.8 grams TDI. The TDI was heated to 100° C. Eighteen grams of HBPA was added slowly in 1¼ hours. Fifteen minutes after the HBPA addition was completed, a preheated (about 50° C.) solution of 35.0 grams of TRIEGMA and 150 ppm of a quinone stabilizer was added over a 5-minute period. Fifteen minutes later, addition of 6.0 grams of HBPA in 3-5 portions was performed. Upon completion of the HBPA additions, the bath temperature was lowered such that the reaction temperature settled to 60°-65° C. To the reaction solution was added 98.2 grams of a 2000 molecular weight polytetramethylene ether glycol (Polymeg 2000) within 2¼ hours. Heating and stirring were continued for an additional hour at 60°-70° C. A diluent solution of 15.2 grams of TRIEGMA and 150 ppm of a quinone stabilizer was added to maintain a fluid reaction medium. Hydroxypropyl methacrylate (96%, 27.4 grams) was added over a 5-minute period, and heating was continued for an additional hour at 60°-65° C. The resultant solution contained approximately 72% concentration of urethane dimethacrylate structures corresponding to the general formula (HPMA*TDI*HBPA*TDI)$_2$*[PTME-2000].

EXAMPLE 7

To a nitrogen swept resin kettle, equipped as described in Example 1, was charged 52.4 grams of liquid, hydrogenated MDI (H$_{12}$-MDI, Hylene W, E. I. du Pont de Nemours and Company, Wilmington, Del. The H$_{12}$-MDI was heated to approximately 100° C. To the diisocyanate was added 10.8 grams of (CHDM)cyclohexanedimethanol over a 20-minute period. This was followed by the addition of a diluent solution of 35.0 grams of TRIEGMA and 150 ppm of a quinone stabilizer over a 10-minute period. When the temperature reached 100° C., 3.6 grams of cyclohexanedimethanol was added slowly. Approximately one-half hour later, a sample was removed for NCO analysis. Titration revealed a titer of 8.40% MCO versus a theoretical (including solvent) titer of 8.10%. Apparently, the desired H$_{12}$-MDI*CHDM*H$_{12}$-MDI prepolymer was achieved. The bath temperature was lowered such that the solution's temperature settled to 60°-70° C. To the reaction solution was added 98.3 grams of a 2000 molecular weight polytetramethylene ether glycol within 1-2 hours. Approximately one hour later, another diluent solution was added (29.1 grams of TRIEGMA and 150 ppm stabilizer). Another sample was withdrawn for NCO analysis. Titration revealed a titer of 3.55% NCO vs a theoretical of 3.62% NCO. Again, the desired prepolymer(s) was apparently formed: (H$_{12}$-MDI*CHDM* H$_{12}$-MDI)$_2$*[PTME-2000]. Hydroxypropyl methacrylate (96%, 44.4 grams) was added over a 10-minute period. Heating was continued at 60°-65° C. The resultant solution contained approximately 70% concentration of urethane dimethacrylate structures corresponding to the general formula (HPMA*H$_{12}$-MDI*CHDM*H$_{12}$-MDI)$_2$*[PTME-2000].

EXAMPLE 8

This example illustrates a typical anaerobic adhesive formulation utilizing any of the prepolymers, or mixtures thereof, described above. With good stirring, add 4.6 grams of hydroxypropyl methacrylate to 79 grams of the prepolymer resin product solution (70-75 percent solids). A slurry of 0.38 gram saccharine in 3.8 grams of triethyleneglycol dimethacrylate is then stirred in. Subsequently, 5.6 grams of acrylic acid (adhesion enhancer) and 2.8 grams of cumene hydroperoxide (CHP) are added and stirring is continued for about 1 hour. Minor amounts of stabilizers, accelerators, thickeners, plasticizers, and the like, may be added, as desired, as is known in the art.

EXAMPLE 9

Anacrobic adhesive formulation were prepared similar to Example 8 using the prepolymers of Examples 1-7.

TABLE I

| Prepolymer | General Structure |
|---|---|
| A | (HPMA*MDI)$_2$*[PTME-650] |
| B | (HPMA*MDI)$_2$*[PTME-1000] |
| C | (HPMA*MDI)$_2$*[PTME-2000] |
| D | (HPMA*TDI*HBPA*TDI)$_2$*[PTME-650] |
| E | (HPMA*TDI*HBPA*TDI)$_2$*[PTME-1000] |
| F | (HPMA*TDI*HBPA*TDI)$_2$*[PTME-2000] |
| G | (HPMA*H$_{12}$-MDI*CHDM*H$_{12}$-MDI)$_2$*[PTME-2000] |

The typical strength properties for these adhesive formulations are reported in Table II, below. Tensile strength measurements were performed according to ASTM D-2095-72. Simply described, this test involves adhering together two steel rods by butt joining their respective ends. The opposite rod ends are then pulled with a measuring device such as an Instron Tester, and the tensile strength of the bond is measured. The tensile lap shear test was performed according to ASTM D-1002-65. This test involves adhering together overlapping surfaces of two steel test strips. The ends of the so-assembled specimens are pulled with a measuring device such as an Instron Tester, and the tensile shear strength of the bond is measured. Compressive shear, tested according to military specification MIL-R-46082A(MR), measures the ability of an adhesive to retain a sleeve or bearing on a shaft. The test involves adhering a cylindrical "pin" within the bore of a mating collar. The force required to press the pin from the collar is then measured on an Instron Tester or equivalent. Impact strength was tested according to ASTM D-950-72. This test involves a steel block mated to another steel block with adhesive and then struck by a swinging pendulum device, such as a Baldwin Impact Tester. The impact force required to separate the blocks is measured. Heat (200° F.) was used, for convenience, to accelerate cure in all tests; for one hour in the tensile and compressive shear tests, and for 1½ hours in the impact test.

TABLE II

| Prepolymer-Adhesive Formulation | Tensile, psi | Tensile Lap Shear, psi (Steel laps, sand blasted) | Compressive Shear, psi | Impact Strength, ft. lbs./sq. in. |
|---|---|---|---|---|
| A | 7440 | 4390 | 3395 | 13.1 |
| B | 5435 | 3535 | 2660 | 5.2 |
| C | 3595 | 2670 | 2680 | 7.0 |
| D | 7390 | 4100 | 5345 | 13.2 |
| E | 9215 | 4150 | 4220 | 13.0 |
| F | 4650 | 3365 | 3325 | 10.2 |

Example 10

The corresponding formulation of prepolymer A was tested for its ability to retain useful levels of strength after lengthy exposure to high temperatures. The excellent strength retention of this formulation is shown in Table III. The strength test used was the compressive shear test already described. The specimens were aged at 400° F. for the number of weeks shown, then divided into two groups, which were tested at room temperature and 400 F, respectively.

TABLE III

| Heat Aging Period, Weeks | Compressive Shear Strength, psi | |
|---|---|---|
| | Room Temperature | 400° F. |
| 0 | 3160 | 275 |
| 3.0 | 1725 | |
| 9.5 | 1770 | 280 |

EXAMPLE 11

Another significant merit of the present prepolymers when formulated as adhesives is their ability to cure through relatively large gaps, e.g., 20 mils or more, to form structurally strong bonds with very high impact strengths. Table IV illustrates typical tensile shears (room temperature cured on sand-blasted steel surfaces primed with a tetramethyl thiourea activator known to the art) and impact strengths (cured either by the above activator at room temperature or heat cured for one and one-half hour at 200° F.).

TABLE IV

| Prepolymer | Tensile Shear, psi, 20-mil gap | Impact Strength ft. lbs./sq. in. | | |
|---|---|---|---|---|
| | | 20-mil gap (primer) | 20-mil gap (heat cured) | 55-mil gap (heat) |
| A | 1645 | 13.4 | 13.4 | 6.4* |
| C | 1195 | 10.7 | | |
| E | 2405 | 13.3 | 12.1 | |
| F | 1195 | 15.7 | 12.5 | 11.2 |
| G | | 9.7 | 10.1 | 3.6 |

*with 6% inorganic as thickener to confer thixotropic properties

EXAMPLE 12

A further distinct advantage of the present prepolymers is their excellent strengths under cryogenic conditions. This is illustrated in Table V, which presents the exceptionally high impact strength, even at large gaps, found for the adhesive formulations, as in Example 9 of representative materials at low test temperatures. Heat (200° F., 1½ hours) was used, for convenience, to accelerate cure in all samples. The blocks were then cooled to the appropriate temperature and promptly tested; otherwise, the impact test procedure was as previously described.

TABLE V

| Prepolymer | | Impact Strength, Ft. lbs./sq. in. | | | |
|---|---|---|---|---|---|
| | | Room Temperature | 0° C. | −40° C. | −80° C. |
| A | 0 mils | 16.7 | 20.0 | 20.1 | 18.3 |
| | 20 mils | 13.4 | 13.9 | 5.8* | 8.1 |
| E | 0 mils | 13.4 | 25.8 | | 23.7 |
| | 20 mils | 12.1 | 11.5 | | 2.7 |
| F | 0 mils | 10.2 | 13.3 | 18.5 | 18.7 |
| | 20 mils | 14.6 | 15.1 | 11.6 | 8.0 |

*heat cured 45 minutes instead of 90 minutes

EXAMPLE 13

A curable formulation was prepared using prepolymer A (Table I) similar to the procedure of Example 8, except that 5% (based on total formulation weight) of benzophenone was substituted for the CHP and saccharine. A 2-5 mil thick film of the formulation was spread on a piece of glass and exposed to ultraviolet radiation. The UV source was a 400-watt mercury vapor bulb housed in a "Porta-Cure 400" lamp, both bulb and lamp manufactured by American Ultraviolet Co. The UV source was adjusted to provide 6000 microwatts of radiation intensity at the film. After 11-13 minutes of exposure, the formulation had cured to a hard, dry film.

The same formulation was used to assemble a lap shear test specimen, except that glass strips were used in place of steel. The specimen was exposed to UV radiation of 6,000 microwatts at the bond line. In about 35 seconds, the glass strips had become fixtured (could not be moved by hand relative to each other).

EXAMPLE 14

An adhesive formulation was prepared using prepolymer E (Table I) according to the procedure of Example 8, except that 3-5% (based in total formulation weight) of benzoyl peroxide was substituted for the CHP and saccharine. A 2-5 mil thick film of the formulation was spread on a steel plate and placed in a 200° F.

oven for 1½ hours, then cooled to room temperature. The formulation cured to a dry, durable film.

A tensile lap shear test (as previously described) was performed. A heat cure was applied (200° F., 1 hour), resulting in a bond strength of 3400 psi.

What is claimed is:

1. A curable, polymerizable adhesive and sealant composition comprising:
I. the reaction product of
   (a) at least a molar equivalent of a hydroxyalkyl acrylate, a hydroxylalkyl methacrylate an aminoalkyl acrylate or an aminoalkyl methacrylate with
   (b) the reaction product of
   (1) a poly(alkylene) ether polyol with
   (2) at least a molar equivalent of the -NCO capped reaction product of:
   (i) an aromatic or cycloaliphatic polyisocyanate with
   (ii) an aromatic or cycloaliphatic polyol or polyamine and,
II. a free radical initiator.

2. A composition of claim 1 wherein the poly(alkylene)ether polyol is linear.

3. A composition of claim 2 wherein the poly(alkylene)ether polyol is poly(tetramethylene) ether glycol.

4. A composition of claim 1 wherein reaction product (b) is an NCO-terminated product of hydrogenated bisphenol-A and toluene diisocyanate.

5. A composition of claim 1 wherein the hydroxyalkyl methacrylate is hydroxyethyl methacrylate.

6. A composition of claim 1 wherein the hydroxyalkyl methacrylate is hydroxypropyl methacrylate.

7. A composition of claim 1 which additionally contains an organic reactive diluent.

8. A composition of claim 7 wherein the reactive diluent is a coreactive reactive diluent.

9. A composition of claim 8 wherein the reactive diluent is isobornyl methacrylate.

10. A composition of claim 8 wherein the reactive diluent is cyclohexyl methacrylate.

11. A composition of claim 8 wherein the reactive diluent is lauryl methacrylate.

12. A composition of claim 8 wherein the reactive diluent is hydroxypropyl methacrylate.

13. A composition of claim 8 wherein the reactive diluent is tetrahydrofurfuryl methacrylate.

14. A composition of claim 1 wherein the initiator is a peroxy initiator.

15. A composition of claim 1 wherein the initiator is an ultraviolet-activated initiator.

* * * * *

UNITED STATES PATENT AND TRADEMARK OFFICE
CERTIFICATE OF CORRECTION

PATENT NO. : 4,309,526
DATED : January 5, 1982
INVENTOR(S) : Louis J. Baccei

It is certified that error appears in the above—identified patent and that said Letters Patent are hereby corrected as shown below:

Column 5, Line 57: Delete the formula

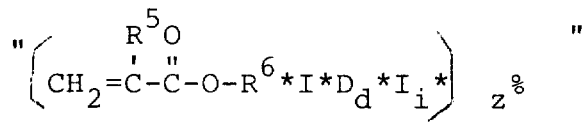

and insert:

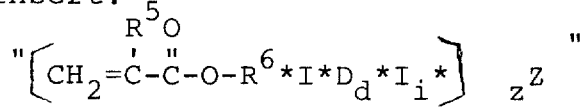

Column 6, Line 45: delete the number "3,042,820" and insert "3,043,820".

Column 8, Line 48: delete "hours" (second occurrence) and insert "minutes".

Signed and Sealed this

Eighteenth Day of May 1982

[SEAL]

Attest:

*Attesting Officer*

GERALD J. MOSSINGHOFF
*Commissioner of Patents and Trademarks*